United States Patent Office 3,331,544
Patented July 18, 1967

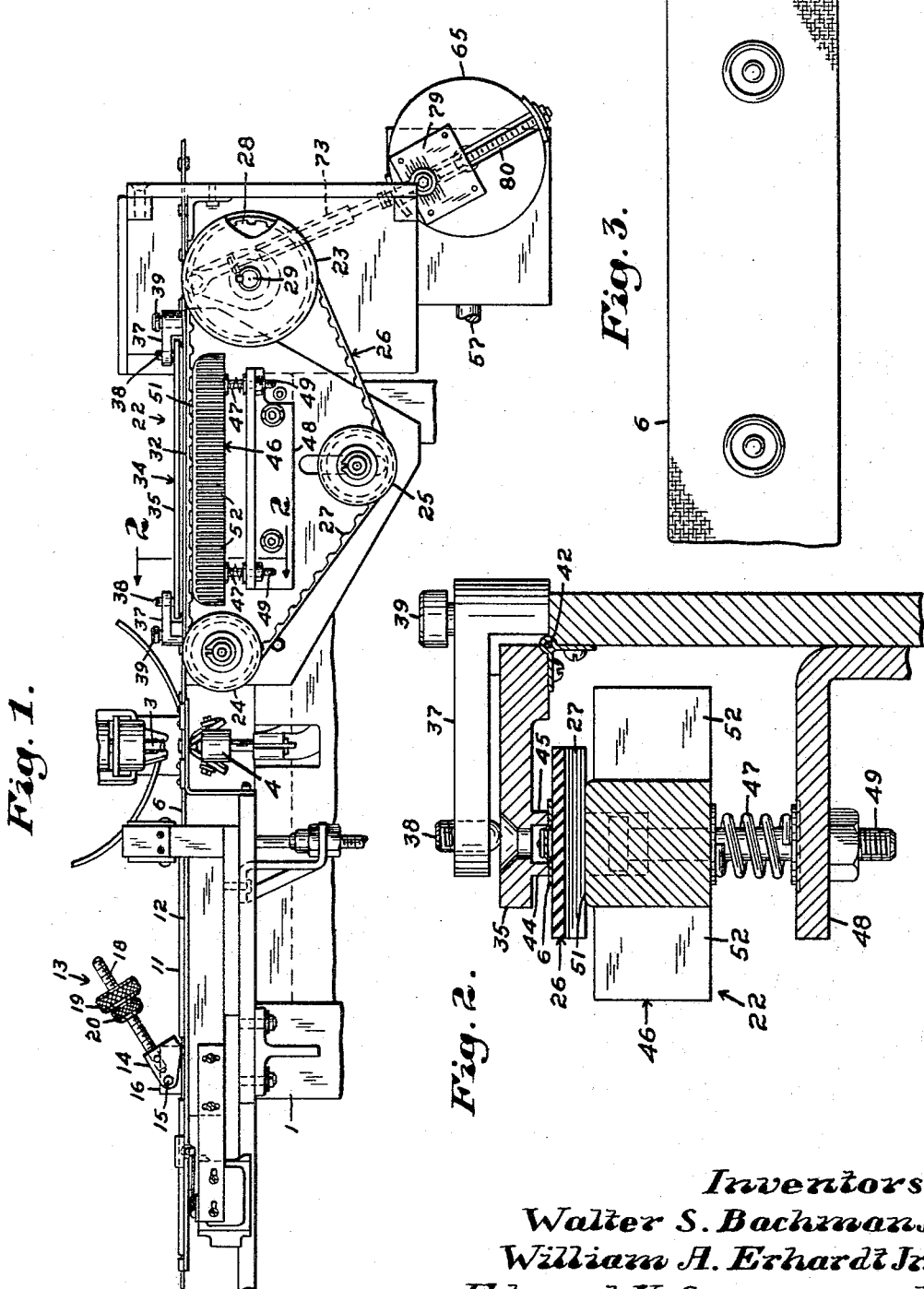

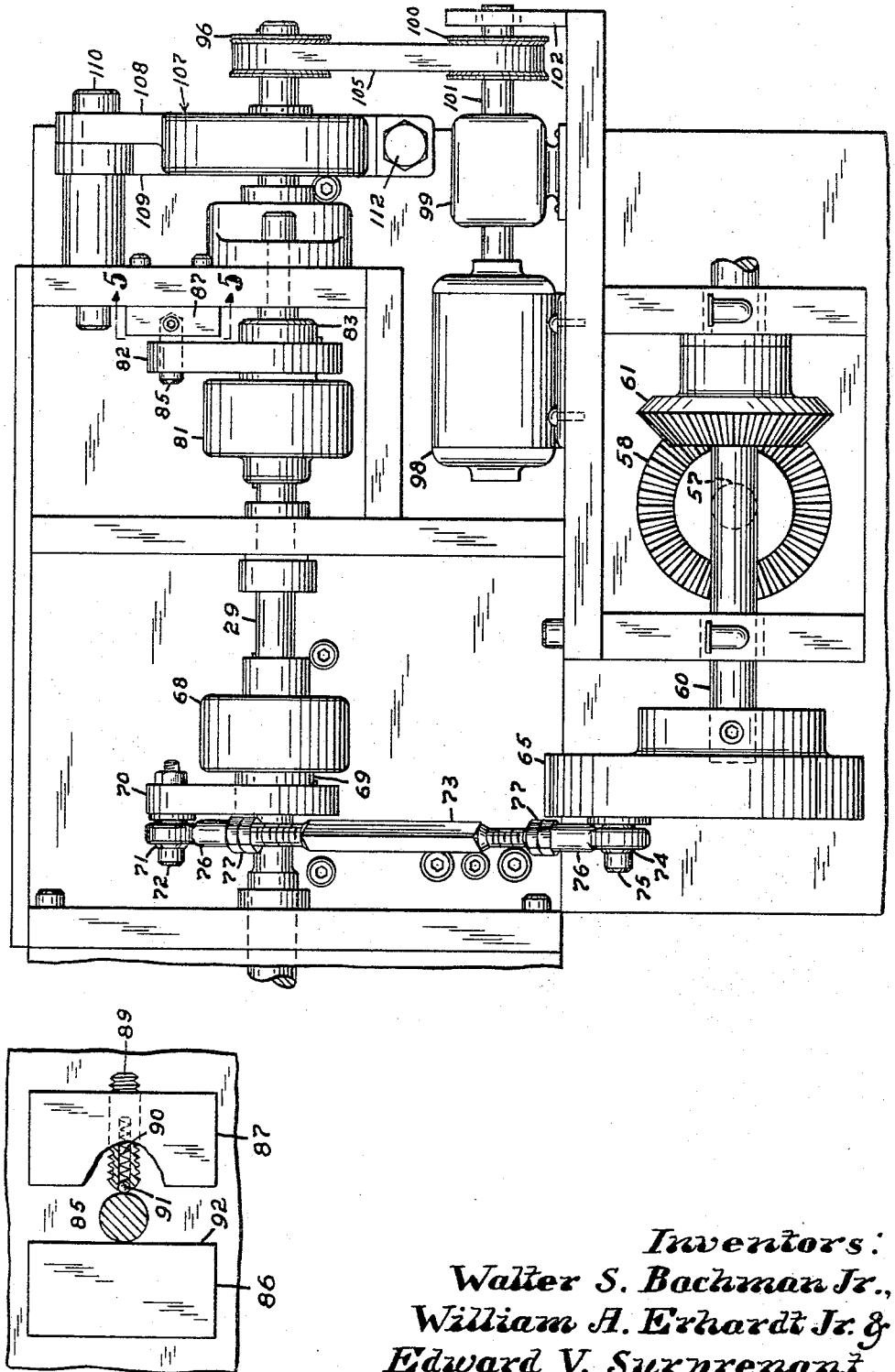

3,331,544
WORK MOVABLE MECHANISM
Walter S. Bachman, Jr., South Acton, William A. Erhardt, Jr., Cambridge, and Edward V. Surprenant, North Tewksbury, Mass., assignors to United-Carr Incorporated, Boston, Mass., a corporation of Delaware
Filed Jan. 25, 1965, Ser. No. 427,882
10 Claims. (Cl. 226—147)

ABSTRACT OF THE DISCLOSURE

A fastener attaching machine having a mechanism which automatically intermittently moves the work and stops the work beneath the fastener attaching tools at predetermined intervals as dictated by the desired spacing between adjacent fastener components. The endless belt which moves the work is driven by a pulley connected to a rotatable shaft. The shaft is rotated in the forward direction through a first one-way slip clutch and is prevented from rotating in the reverse direction by a second one-way slip clutch of opposite hand from the first clutch. The machine is also equipped with an automatically adjustable and variable weight which presses against the work and provides a constant drag thereon as the work moves through the machine.

This invention pertains to work movable mechanisms and related structure for use with machines for performing operations on workpieces and to such machines, especially, though not exclusively, automatic fastener attaching machines incorporating such mechanisms and related structure.

It is a principal object of the invention to provide such a mechanism and related structure and such a machine incorporating such mechanism and related structure which are novel.

Objects besides the above general one and the important accomplishments and features of the invention will appear upon reading the following detailed description of a preferred and illustrative form of the invention in conjunction with the accompanying drawings, in which:

FIG. 1 is a fragmentary front elevational view of an automatic fastener attaching machine incorporating the work movable mechanism and related structure according to said form of the invention;

FIG. 2 is an enlarged cross-sectional view taken on the line 2—2 of FIG. 1 and in the direction of the arrows;

FIG. 3 is a greatly enlarged, fragmentary, top plan view of the work to which fastener combinations have been attached;

FIG. 4 is an enlarged, fragmentary, end elevational view of the machine as seen from the right in FIG. 1; and FIG. 5 is a greatly enlarged cross-sectional view taken on line 5—5 in FIG. 4 and in the direction of the arrows.

Referring to the drawing figures in detail, the reference numeral 1 designates the supporting structure of an automatic fastener attaching machine or, more accurately an automatic fastener combination attaching machine which supporting structure extends to and rests on the floor. A conventional type of fastener combination attaching mechanism includes a punch and a die part, 3 and 4 respectively, which come together for the securing or attachment of the two parts of a fastener combination, such as a stud and eyelet or a ring and socket together with the work, which is a tape of fabric or other material 6, therebetween, thus attaching the fastener combination to the work. The punch and die parts then separate and the associated jaws receive their fastener parts from feeding means not visible in the drawing, such punch and die parts then coming together again for another attaching operation when the tape 6 has moved to a new location and stopped.

The tape 6 comes from a reel (not shown) at the left of the attaching machine as viewed in FIG. 1 moving along the combination tape support and guide means 11 of the usual type before passing between the punch and die parts 3 and 4 respectively. Where the work is a fabric or other material which is subject to appreciable stretching when being handled with resiliency to return it at least nearly to its unstretched condition when it is free, special means 13 is provided to achieve an unchanging or constant drag on the work together with the portion of the flat work supporting plate 12 of the means 11 thereunder as the work is being pulled across in front of the attaching machine and between the punch and die parts thereof by the work moving mechanism generally designated 22.

The means 13 comprises a sector shaped block of metal 14 pivotally mounted on a pin 15 extending horizontally forwardly from a vertical supporting wall 16 mounted on the attaching machine. A straight rod 18 is threadly received within the block 14 at the transverse midpoint thereof, at the outer end of which rod is a weight 19 threadedly received thereon. This weight may be rotated up and down the threaded rod to adjust the means 13 so as to produce the desired drag on the work together with said portion of the plate 12 and thus the desired tension in the work as it is being moved along by the mechanism 22. A locking element 20 is threadedly received on the rod 18 which element is turned tight against the weight 19 for retaining the latter in its selected position. It should be obvious that the total weight of the means 13 tends to swing the means down so as to bear against the top surface of the work thereacross for applying the desired constant drag on such work together with said portion of the plate 12 as the work is pulled along by the mechanism 22. Where the work is such as not to stretch to any significant degree, if at all, during the pulling thereof by the mechanism 22, use of the means 13 is unnecessary, satisfactory, though changing, drag being provided by the usual coil spring at the side of the tape reel (not shown) on the supporting shaft therefor.

The work moving mechanism 22 comprises a drive pulley 23 and two idler pulley 24 and 25 over which a timing type endless rubber belt 26 passes having teeth 27 in engagement with teeth of the pulleys, as 28 in pulley 23, located around the periphery of the three pulleys. The idler pulley 25 is adjustable up and down for mounting the belt on the pulleys and for adjusting the belt to the desired tension. The drive pulley 23 is mounted on a drive shaft 29 which is rotatable intermittently in a clockwise direction as seen in FIG. 1. The successive movements of this shaft, when so intermittently operating, are virtually equal angular amounts, the successive time intervals between these movements also being virtually equal to each other. The drive means for this manner of shaft operation which is transmitted to the belt 26 through the drive pulley 23 which latter is positioned to pull rather than push the belt and with it the work through the portion of the mechanism 22 between the pulley 23 and 24 will be covered subsequently.

The work 6 passes on top of and along with the upper, horizontal, long reach 32 of the belt 26 moving to the right as seen in FIG. 1 with the belt. The reference numeral 34 generally designates means for continually holding the work 6 against the upper surface of the reach 32 of the belt 26 for intermittent movement of the work with the belt when the latter moves in this manner. The work holding means 34 in the present instance comprises a horizontally disposed plate member 35 which is secured against upward movement by a pair of lugs 37, one at each end, which engage the top of said plate through a pair of set screws 38 and which lugs 37 are horizontally swingably mounted on pins 39. The plate member 35 is itself swingably mounted on a horizontal, longitudinally disposed hinge 42 to permit upward swinging movement thereof after swinging of the lugs 37 out of the way after loosening of the screws 38 to provide for placement of the front end portion of the tape 6 on the long reach 32 of the belt 26 to be followed by downward movement of the member 35 thereupon it and the swinging of the lugs 37 into the plate retaining position shown in FIG. 1 and the tightening of the set screws 38 which is preliminary to the automatic movement of the work across the attaching machine in an indexing manner.

Referring to FIG. 2, a pair of spaced, longitudinally extending ribs 44 and 45 bear against the upper surface of the work or tape 6 during movement of the latter across the attaching machine. The member 35 is constructed of metal which is finished at the bottom surfaces of the ribs 44 and 45 so as to have a very low coefficient of friction so as not to appreciably inhibit the movement of the work therealong. The belt 26, on the other hand has a very high coefficient of friction for intimate adherence of the work to it continually throughout the high speed interrupted movement thereof with virtually no slipping or relative movement whatsoever between the work and belt as long as the work is held against the belt by the means 34.

The means 34 also includes a resiliently mounted pressure pad generally designated 46 which resiliently bears against the underside of the long reach 32 of the belt 26 to firmly urge the belt against the work 6 passing thereover and the latter work in turn against the top plate member 35 for the continual holding of the work against the upper surface of the reach 32 of the belt as above mentioned.

The member 46, which is essentially a long solid block of metal, is so resiliently urged upwardly by a pair of coil springs 47 resting on an angle iron 48 fixedly mounted on the supporting structure of the attaching machine. A pair of bolts 49 pass through the member 46 and the springs 47 and also the top flange of the angle iron 48 for general or loose retention of the member 46 on the fastener attaching machine by the additional use of nuts threaded on the lower parts of the bolts. In this general connection, it should be apparent when the work 6 is placed upon the upper reach 32 of the belt 26 with the plate member 35 in its upwardly swung position during the initial placement of the work for the operation of the attaching machine thereon and the plate member 35 is thereupon swung downwardly and locked in place by the two swingable lugs 37 and the set screws 38 that a certain downward movement of the member 46 against its springs 47 will take place to further compress the springs or to compress them to some extent in the first instance, thus placing the resiliently mounted member 46 in the previously indicated condition of pressing upwardly against the belt and work and all of it against the top plate member 35 for the holding of the work in the previously indicated friction adhering relation with the belt 26.

Considering especially FIG. 2, the pressure pad 46 has a central, longitudinally extending, flat surface portion 51. This surface is of a smooth, polished nature of a low coefficient of friction so as to create as little heat as possible during the sliding movement of the inner flat surfaces of the teeth or projections 27 of the belt thereover. To each side of this central pad portion 51 are transversely-extending, longitudinally spaced, parallel, thin fin portions 52 of the member 46 which serve to radiate the heat within the member 46 to the air for air cooling of the member and also of the engaged belt and even of the work and plate member 35.

It should be evident by way of review that by virtue of the high coefficient of friction of the rubber or the like, belt 26 and the very low coefficient of friction of the narrow bottom surfaces of the ribs 44 and 45 of the plate member 35, the work 6, which may be of any of many different fabrics or materials from smooth and/or relatively slippery composition to coarse and/or completely non-slippery composition, will continually and intimately adhere to the upper surface of the endless belt during the intermittent movement of the belt while it will easily slide along the smooth bottom surfaces of ribs 44 and 45. It should be mentioned in this connection that the belt 26 and consequently the work 6, which is continually and firmly held thereon, travels at the extremely high rate of speed of 1,200 inches per minute when the shaft 29 is rotating at its full speed and that, obviously, the belt and work combination must stop rapidly and completely after each individual movement thereof after which the belt and work must start to move rapidly for the next movement to once again reach the high rate of speed, of 1,200 inches per minute during this movement and then stop abruptly at the next position of the work for the next successive attachment operation, and so on repeatedly. It should be made most plain that virtually no slipping whatsoever must occur between the work and belt 26 during either the stopping or the starting of the successive rapid movements of the belt, nor can any back movement of the belt or work be tolerated by way of relieving uneven internal tensions of the belt due to unevenness of belt thickness around its periphery and the effects of the driving pull thereon, resulting from the action of the drive pulley 23, in contrast to the less tensioned condition of the belt after leaving the drive pulley and while passing over the idler pulleys, and from the effect of work which can be stretched and which has a tendency to return to its unstretched condition. Any back movement from whatever source will, of course, effect the indexed position of the work, that is, when it is stopped for the fastener combination attaching operation so as to lose the predetermined spacing of the fastener combinations along the work. Such predetermined, equal spaces within about plus or minus seven thousandths of an inch tolerance is coming more and more to be required by garment manufacturers and others to permit automatic rapid fastening of the male and female fastener combinations on two tapes or portion of tapes, for instance. This near exactness is especially necessary where the fastener combinations are miniature in size, very slight in exactness in their attached positions beyond about the plus and minus seven thousandths of an inch preventing this automatic attachment in any uniform or total sense at all and with the desired assurance of such attachment. Relatively close spacing or at least not distant spacing also requires this accuracy for the automatic fastening thereof above mentioned. It is important to point out that no machine or mechanism presently known is capable of attaching the fastener combinations to the work at anywhere near at all the accuracy of plus and minus seven thousandths of an inch at anywhere near the high rate of speed of 1,200 inches per minute which the present attaching machine together with the disclosed mechanism 22 does. This great accuracy at this high rate of speed is a principal, if not the principal accomplishment of the present invention over the previously known devices for making fastener combination attachments to work and reflects a principal object of the invention.

The drive portion of the mechanism 22 will now be covered. Power comes into the mechanism by way of a shaft 57 which is operatively connected to or is a part of the drive mechanism for operating the automatic fastener attaching machine upon which shaft 57 is mounted a mitre gear 58 both of which turn in a counterclockwise direction as seen in FIG. 4. The mechanism 22 includes a horizontally, transversely disposed shaft 60, suitably supported by bearings, upon which is mounted a mitre gear 61 for rotational movement by the gear 58 in a clockwise direction as it would be seen in FIG. 1 if shown. An end crank 65 of conventional form is mounted on the forward end of said shaft 60.

The shaft 29 is mounted parallel to shaft 60 and above and forwardly thereof as seen in FIG. 1. A one-way, right hand slip clutch 68 is mounted on shaft 29 by keying. A crank arm 70 is mounted by means of a key on the hub 69 of the outer part of the clutch 68. A rod end 71 is nonrotatably secured to the outer end of the crank arm 70 by means of a cap screw 72 and nut to which rod end the crank connecting rod 73 is rotatably connected. The lower end of this connecting rod is rotatably connected to the end crank 65 by means of a rod end 74 and cap screw 75. The connecting rod or link 73, which comprises a pair of internally threaded ends 76 and a connecting rod per se threaded at each end for reception within the ends 76 and a pair of lock nuts 77, can of course, be adjusted for length in the well-known manner. The position of the lower rod end 74 and its cap screw can also be adjusted toward the center and away therefrom of the end crank 65, which is the center of the shaft 60, within the slot 80 of the end crank also in the well-known manner, which adjustment adjusts the amount of rotational turning of the shaft 29 through the crank arm 70 and one-way clutch 68. A scale 79 on the end crank is calibrated to produce different desired lengths of movements of the belt 26 together with its work 6 held thereon to produce the desired predetermined spacing of the fastener combinations on the work. Such a desired spacing may be two inches, for instance, plus and minus the seven thousandths of an inch tolerance above mentioned.

From the position of the parts shown in FIGS. 1 and 4, the connecting rod 73 and crank arm 70 are about to commence their driving stroke for rotation of the shaft 29 and drive pulley 23 and movement of the belt 26 the predetermined amount for advancing the work the desired amount for the automatic attaching of the next fastener combination thereto which for the adjustment indicated would be a belt and work movement of two inches within the tolerances stated. After the driving stroke, the rod 73 and crank arm 70 will go through their return movement at which time slippage or resetting will occur within the clutch 68 without driving the shaft 29 in order to reposition said rod and crank arm for the next driving stroke, this driving movement followed by a return stroke with clutch slipping being repeated so long as the work is passing through the attaching machine or it is desired to attach fastener combinations to the work.

To hold the shaft 29 exactly where it is at the end of each driving stroke of the connecting rod 73 and crank arm 70 a one-way slip clutch 81, like 68, but left handed, is mounted on the shaft by keying. A crank arm 82 here referred to as a reference crank, is mounted by keying to the hub portion 83 extending from the outer of the two concentric portions of the clutch. The crank arm 82 extends upwardly and has a horizontal pin 85 nonrotatably attached thereto. The pin extends between a pair of spaced, parallel, rectangular block members 86 and 87 which are immovably attached to the supporting structure of the attaching machine by suitable means. The block 87 contains a ball plunger 89 which, by means of its included coil spring 90 and ball 91, continually urges the pin 85 and thus the end of the crank arm 82 against the inner, vertical, flat surface 92 of the block 86, hereinafter referred to as the reference plane.

It should thus be seen that the outer end of the reference crank 82 and its attached pin 85 are free to move upwardly and downwardly as seen in FIGS. 2 and 3 or, more precisely, in a radial or inner and outer direction relative to the center of the clutch 81 and shaft 29 while being retained against the referenced plane or surface 92 by means of the resilient ball plunger 89. This relation and construction permitting the same together with the use of the second clutch 81 is of paramount importance to the present device. In the first place, the clutch 81 which will be referred to as the second clutch virtually absolutely prevents any back rotation of the shaft 29 after each driven movement thereof as the result of a driving stroke of the crank arm 70 and connecting rod 73 which would otherwise take place because of the previously noted uneven tension in the drive belt 26 and any force within the work itself trying to return to its unstressed condition because of any stretching that may take place within the same. Such prevention of any back rotation of the shaft 29 is essential in order to preserve the full and predetermined advance of the work as the result of the drive stroke of the connecting rod 73 and crank arm 70 without any diminishment thereof whatsoever each time such a drive stroke takes place to always keep the space the same, within the very close tolerance of plus and minus about seven thousandths of an inch, between the fastener combinations that are attached to the work in cooperating with the operation of mechanism 22 for moving the work the successive equal amounts.

In this connection, however, the precise predetermined movements of the work between each attaching operation with tolerances of about plus and minus seven thousandths of an inch cannot be had unless the second clutch 81 is allowed to function in a totally free and non-binding fashion so as not to change in any respect its intended manner or working. In order to preserve the proper functioning of this clutch, the end of the reference crank arm 82 must be free to float or move inwardly and outwardly relative to the center of the clutch 81 and of the shaft 29 in order to provide for the running out or non-perfect rotation of the shaft 29, which may not be large but nevertheless capable of greatly affecting the accuracy of the predetermined movements of the belt and work unless a free floating arrangement, just mentioned, is provided. For instance, it has been determined that tying the outer end of the reference crank arm 82 by screwing or otherwise affixing the attached pin 85 to a supporting structure such as block 86 so as not to allow said radial or inner and outer movement of the crank arm 82 relative to the center of the shaft 29 to occur produces a tolerance of plus and minus thirty thousands of an inch in the spacing of the fastener combinations along the work. In some applications as where extremely large fastener combinations are being attached to work at rather large distances or even perhaps where smaller fastener combinations are being attached at rather great distance intervals and especially where the male and female fastener combinations are to be connected or snapped together by hand in a slow, individual manner, this greater tolerance may be acceptable. It should be noted in this combination that the present mechanism 22 in cooperation with the fastener attaching machine is capable of moving the work at the extremely high rate of speed of 1,200 inches per minute including the stops for the fastener attaching operations thereon even with this accuracy of plus and minus thirty thousandths of an inch, many times faster than any previous mechanism and attaching machine combination with even anywhere near this amount of accuracy. Where a greater accuracy than the plus and minus thirty thousandths is desired, the free floating movement of the reference crank arm 82 and its pin 85 in a radial direction is absolutely essential. Likewise for this accuracy, it is further absolutely essential that the end of the reference crank arm 82 through its pin 85 is kept at all times against the reference plane or surface 92 by resilient spring urging such as by the use of the ball plunger 89; otherwise, inaccuracy due to back and forth arcuate movement, even though slight, of the pin 85 between the blocks 86 and 87 will be present in the system besides the mechanical beating that will take place between the surfaces of the blocks 86 and 87 and the moving pin 85, thus to add even further inaccuracy by flattening of the pin and indentation of the blocks 86 and 87 to increase the arcuate movement of the pin 85.

It is important to point out that the shaft 29, drive pulley 23, belt 26 and work 6 held on the latter can be moved in their forward and only directions independently of the power train from the shaft 57 to and including the clutch 68 by turning the shaft 29 in the clockwise direction as seen in FIG. 1 through both of the clutches 68 and 81 in slipping relation thereto. Such operation of part of the mechanism 22 overridingly or slippingly through the clutches 68 and 81 is most important in that a secondary drive means can be employed to turn the shaft 29 and pulley 23 and move the belt 26 and work 6 independently of the rest of the mechanism 22 and the fastener attaching machine and when the same have temporarily, for instance, stopped operating as, for instance, for moving the tape a certain distance without any fastener combinations being put in therealong after which the entire mechanism 22 and the attaching machine can be operated for automatically making a predetermined number of fastener combination attachments to the work followed by another independent movement of the work without the fastener combinations being put in and so on along the length of the tape. Such an interrupted pattern or grouping of fastener combinations on the tape would be most useful, for instance, in connection with women's blouses where two pieces of tape, one for each side with so many fastener combinations in the mid or principal portions thereof with considerable end portions of each piece of tape free of fastener combinations where they are not necessary or desired for the sewing in of the pieces of tape into the blouses.

Such a secondary drive means for the shaft 29 and the members driven thereby including the work is shown in FIG. 4 to comprise a timing type pulley 96 similar to pulley 23 mounted on the rear end portion of the shaft 29 by keying, an electric motor 98 mounted on a portion of the fastener attaching machine, a clutch and brake unit 99 mounted on the same support and connected to the motor shaft, a second pulley 100 like pulley 96 keyed to the short shaft 101 which is connected to the unit 99 and supported at the other end by a bearing at 102, and a timing type belt 105 like belt 26 which passes over the pulleys 96 and 100. It should be apparent from considering the components 96 through 105 that either automatic or timed or manually controlled operation of the motor 98 will result in rotation of the shaft 29 for the movement of the work 6 independently of the operation of the entire mechanism 22 and of the fastener attaching machine without any fastener combinations being attached to the work, the automatic or manual shutting off of the motor 98 to be followed by operation of the full mechanism 22 and the fastener attaching machine will, of course, result in the automatic fastener combinations attaching operations being performed on the work.

To complete the description a squeeze-type brake 107 comprising a pair of substantially semicircular, complementary arms 108 and 109 connected by a shouldered cap screw 110 at the top and continually brought together at the bottom by a spring loaded nut and bolt combination 112 and with each arm 108 and 109 having a strip of braking material such as asbestos on the internal surface thereof is present at the rear portion of the shaft 29 to continually apply drag or braking to a wheel member (not shown) keyed to the shaft 29 within the brake 107. Where the spacing of the fastener combinations along the work 6 is about two inches or under, enough internal resistance will be had within the mechanism 22 to suffice for rapidly stopping the portion of the same between the shaft 29 and work 6 at the end of each drive stroke of the connecting rod 73 and crank arm 70 without the brake 107; but should a spacing of greater than two inches or thereabouts be desired, which may be had, of course, by proper adjustment of the eccentric movement of the lower rod end 74, additional braking which is provided by the brake 107 is required. Use of the brake 107 is absolutely essential to effect rapid stopping of the shaft 29 and other components together with the internal resistance or the drag of the system for the previously mentioned great accuracy of the fastener combination spacing along the work. The mechanism 22 illustrated in the drawing figures is capable of successive movements of the work and consequently a spacing of the attached fastener combinations therealong of as great as five inches with the plus and minus seven thousandths of an inch tolerance. Greater spacing may be had with this accuracy by the use of a larger brake.

Although a spring loaded tensioning or drag means may be employed in lieu of the means 13, this requires adjustment for different thicknesses of work which adjustment is very difficult to get correct especially quickly. The present arrangement of a pivotably mounted weight is instantly usable on any thickness of work passing thereunder of a given type without adjustment and also with any type of fabric or material with a but simple adjustment of the position of the weight 19 at the upper end thereof whenever required. Of course, a block of metal, for instance, resting on and under which the work slides would have a similar effect of constant or unvarying drag as in the case of means 13 and also the same constant drag on the work regardless of the thickness thereof; but, of course, would not be adjustable for different types of fabric or material, nor would it be as convenient as the present pivotable weight means 13.

It is not desired to limit the work movable mechanism and the constant drag means, where necessary or pertinent, necessarily to use with a machine for attaching fastener combinations inasmuch as other single or even multiple operations may be performed on the work, which also may not be tape, at spaced predetermined intervals with quite fast work movement speeds and requiring accuracy of the spacing that the present mechanism is capable of producing.

Although but a single illustrative embodiment of the invention has been shown in the drawings and described in detail in the specifications, it is not desired to limit the appended claims to the same inasmuch as many variations of structure and other embodiments of the invention may be had and are in fact had in mind. Such claims, therefore, should be limited only by their own terms liberally construed in the overall broad light of the invention in is various aspects.

What is claimed is:

1. A work movable mechanism for use with a machine for performing an operation on the work at a fixed location in the machine each time the work comes to rest comprising:
  (a) means for engaging the work in a positive, non-slipping fashion and moving the work in one direction and stopping the work,
  (b) means for causing the first recited means to intermittently move the work predetermined amounts in said one direction and for causing said first recited means to stop the movement of the work and to prevent no more than a negligible amount of movement of the work in a direction opposite said one direction at any time the mechanism is operating,
  (c) said second recited means including
    (1) a rotatable shaft connected to said first-recited means and having a first one-way slip clutch mounted thereon,
    (2) a crank arm mounted on said clutch to rotate the shaft through the clutch in one direction a predetermined amount, said clutch being adapted to slip on the shaft during counterrotation of the crank arm to its starting position,
    (3) a second one-way slip clutch of opposite hand from said first clutch mounted on shaft, and
    (4) means retraining said second clutch from any rotation in the direction opposite to which said shaft is rotated by said crank arm through said first clutch thereby preventing any rotation of said shaft in said opposite direction, and (d) means for continually rotating said crank arm alternately in opposite directions about the rotational axis of said shaft.

2. A work movable mechanism according to claim 1 in which said means restraining said second clutch from any rotation in the direction opposite to which said shaft is rotated by said crank arm permits movement of said second clutch in a radial direction with respect to the rotational axis of said shaft.

3. A work movable mechanism according to claim 1 including means for rotating said shaft slippingly through said two clutches in the same direction in which said shaft is rotated by said crank arm.

4. A work movable mechanism for use with a machine for performing an operation on the work at a fixed location in the machine each time the work comes to rest comprising:

(a) means for engaging the work in a positive, non-slipping fashion and moving the work in one direction and stopping the work, (b) means for causing the first recited means to intermittently move the work predetermined amounts in said one direction and for causing said first recited means to stop the movement of the work and to prevent no more than a negligible amount of movement of the work in a direction opposite said one direction at any time the mechanism is operating, (c) said first recited means including
  (1) an endless belt mounted for intermittent movement by said second recited means and having a relatively high coefficient of friction on its work engaging surface and
  (2) means holding the work on said belt in substantially non-slipping fashion with respect to the belt during movement and stoppage of the belt, (d) said second recited means including
  (1) a rotatable shaft connected to said first-recited means and having a first one-way-slip clutch mounted thereon,
  (2) a crank arm mounted on said clutch to rotate the shaft through the clutch in one direction a predetermined amount, said clutch being adapted to slip on the shaft during counterrotation of the crank arm to its starting position,
  (3) a second one-way slip clutch of opposite hand from said first clutch mounted on said shaft and
  (4) means restraining said second clutch from any rotation in the direction opposite to which said shaft is rotated by said crank arm through said first clutch thereby preventing any rotation of said shaft in said opposite direction, (e) means for continually rotating said crank arm alternately in opposite directions about the rotational axis of said shaft.

5. A work movable mechanism according to claim 4 in which said belt is flexible and said first recited means includes a plurality of rotatably mounted pulleys, one of which is operably connected to said shaft, said one pulley being adapted to move said belt responsive to rotation of said shaft and stop said belt with negligible slippage occurring between the belt and said one pulley.

6. A work movable mechanism according to claim 5 in which said one pulley is so located relative to said means holding the work on said belt that said belt and the work are pulled through said means holding the work as opposed to being pushed through said means.

7. A work movable mechanism according to claim 5 including means for rotating said shaft slippingly through said two clutches in the same direction in which said shaft is rotated by said crank arm.

8. A work movable mechanism according to claim 4 in which said means restraining said second clutch from any rotation in the direction opposite to which said shaft is rotated by said crank arm permits movement of said second clutch in a radial direction with respect to the rotational axis of said shaft.

9. A work movable mechanism according to claim 4 in which said means for rotating said crank arm includes a second continuously, unidirectionally rotating shaft, an end crank mounted on one end of said shaft, and means connecting said end crank to said crank arm in such a manner as to cause alternate rotation of said crank arm about the rotational axis of said first shaft responsive to rotation of said second shaft.

10. A work movable mechanism for use with a machine for performing an operation on the work at a fixed location in the machine each time the work comes to rest comprising:

(a) means for engaging the work in a positive, non-slipping fashion and moving the work in one direction and stopping the work, said means being adapted to pull the work past the fixed location for performing an operation on the work and including
  (1) a weight pressing against at least one side of the work to provide a constant drag on the work when the work is moving, (b) means for causing the first recited means to intermittently move the work predetermined amounts in said one direction and for causing said first recited means to stop the movement of the work and to prevent no more than a negligible amount of movement of the work in a direction opposite said one direction at any time the mechanism is operating, (c) said weight being
  (1) automatically adjustable to accommodate various thicknesses of work and
  (2) variable to increase and decrease the pressure exerted on the work thereby, and (d) means exerting pressure on the other side of the work which opposes and balances the pressure exerted by said weight during movement of the work.

References Cited

UNITED STATES PATENTS

| | | | |
|---|---|---|---|
| 828,546 | 8/1906 | Hart | 83—155 X |
| 1,389,618 | 9/1921 | Bingham | 83—245 |
| 1,542,104 | 6/1925 | Smith | 83—155 |
| 1,844,820 | 2/1932 | Morey | 83—155 |
| 2,216,629 | 10/1940 | Sabel et al. | 83—100 X |
| 2,224,599 | 12/1940 | Hinstom | 227—100 X |
| 2,477,101 | 7/1949 | Treciokes | 227—100 |
| 2,657,601 | 7/1949 | Bentley | 83—422 X |
| 3,081,014 | 3/1963 | Anderson et al. | 226—147 X |

WILLIAM W. DYER, JR, *Primary Examiner.*

JAMES M. MEISTER, *Examiner.*